United States Patent [19]

Bartos

[11] Patent Number: 4,724,833
[45] Date of Patent: Feb. 16, 1988

[54] PORTABLE EMERGENCY BREATHING APPARATUS

[75] Inventor: Josef A. Bartos, Diamond Bar, Calif.

[73] Assignee: Respirator Research, Ltd., Willoughby, Ohio

[21] Appl. No.: 858,705

[22] Filed: May 2, 1986

[51] Int. Cl.⁴ .............................................. A62B 9/02
[52] U.S. Cl. .................................. 128/205.24; 137/495
[58] Field of Search ............... 137/494, 495, 497, 564, 137/565, 505, 565.3, 136, 500, 501, 503, 505.14; 128/205.24

[56] References Cited

U.S. PATENT DOCUMENTS

| | | | |
|---|---|---|---|
| 1,701,284 | 2/1929 | Terry | 137/505 |
| 2,117,952 | 5/1938 | Gourdou | 128/202 |
| 2,119,473 | 5/1938 | Smith et al. | 50/11 |
| 2,212,626 | 8/1940 | Thomas | 137/497 |
| 2,521,637 | 9/1950 | Lack | 137/505.36 |
| 2,687,018 | 8/1954 | Baldwin, Jr. et al. | 62/1 |
| 2,720,887 | 10/1955 | Safford | 137/505.36 |
| 2,767,733 | 10/1956 | Anderson | 137/497 |
| 2,951,494 | 9/1960 | Holmes | 137/64 |
| 3,195,805 | 7/1965 | Cholvin et al. | 137/500 |
| 3,710,553 | 1/1973 | Parker et al. | 55/316 |
| 3,805,780 | 4/1974 | Cramer et al. | 128/142.2 |
| 3,812,877 | 5/1974 | Fleischhacker et al. | 137/505.36 |
| 3,825,029 | 7/1974 | Genbauffe | 137/505 |
| 3,886,968 | 6/1975 | Murrell | 137/501 |
| 4,163,448 | 8/1979 | Grouard | 128/142.2 |
| 4,266,539 | 5/1981 | Parker et al. | 128/204.26 |

FOREIGN PATENT DOCUMENTS 208082 12/1923 United Kingdom ................ 137/497

Primary Examiner—Edward M. Coven
Assistant Examiner—K. Reichle
Attorney, Agent, or Firm—Body, Vickers & Daniels

[57] ABSTRACT

Portable emergency breathing apparatus is disclosed which is comprised of a compressed breathing gas container having a housing mounted on the open end thereof which supports a pressure gauge, a pressure reducing valve assembly, and burst valve, fill valve and needle valve components. The pressure reducing valve controls the flow of breathing gas from the container to a breathing hose attached to the housing and leading to a face mask or hood worn by the user. The housing has a flat axially outer end relative to the container and a radially outer periphery which is within the cylindrical plane of the side wall of the container, and the housing is structured for mounting on the container so as to optimize compactness of the apparatus and protection of the pressure gauge and the pressure reducing, burst, fill and needle valves from damage during storage and use. A modification of the housing enables the apparatus to include two or more compressed breathing gas containers in side-by-side relationship, thus to increase the duration of use of the apparatus.

11 Claims, 10 Drawing Figures

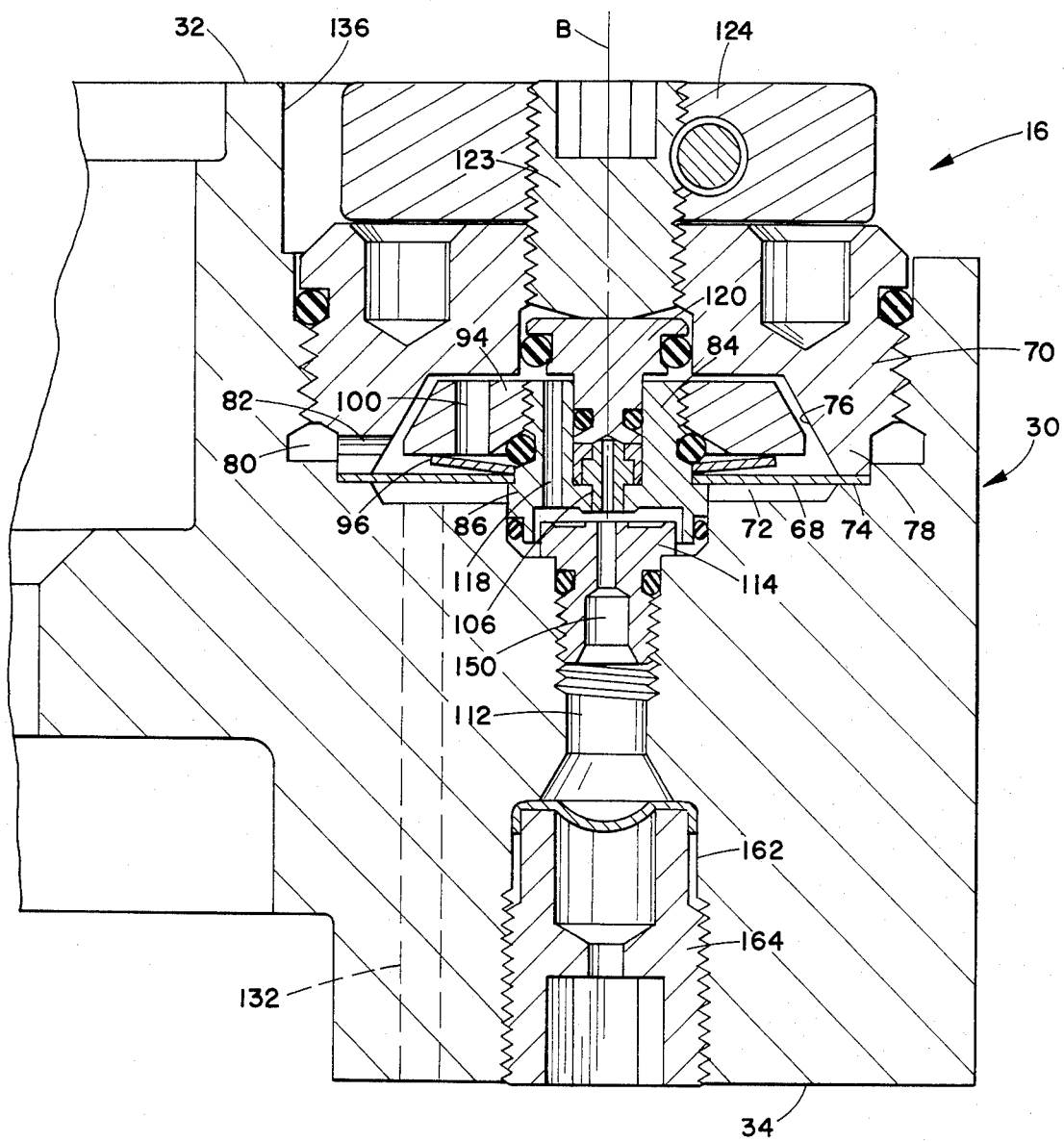
F I G. 4

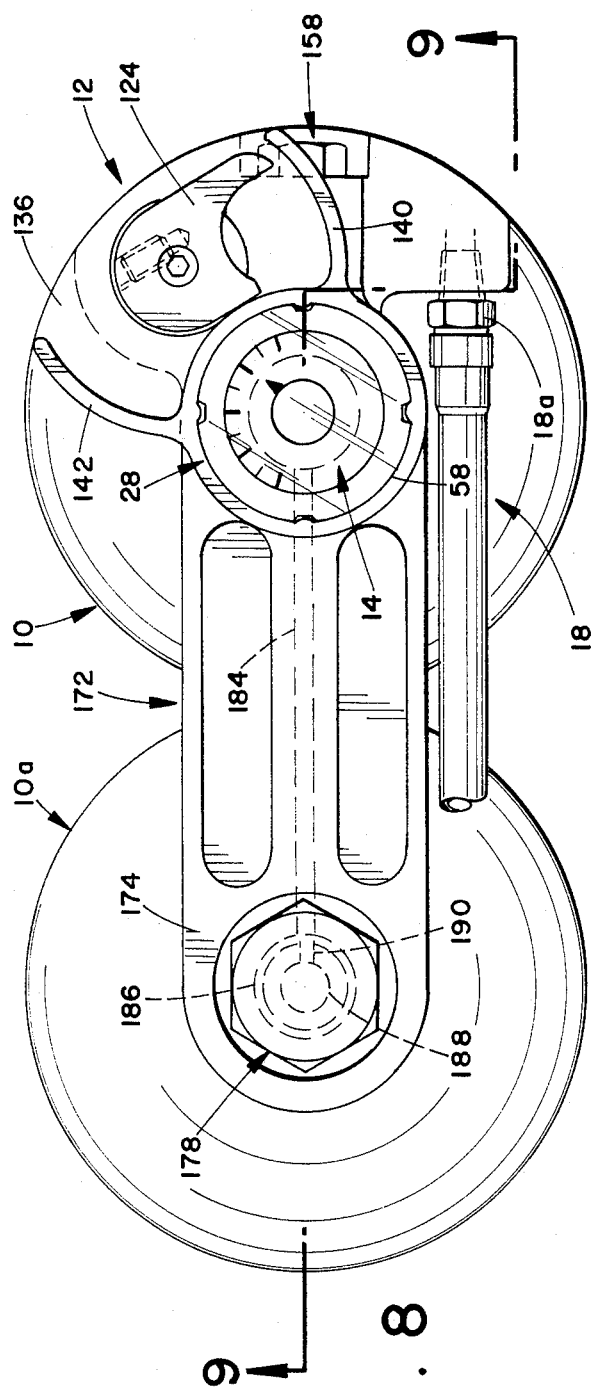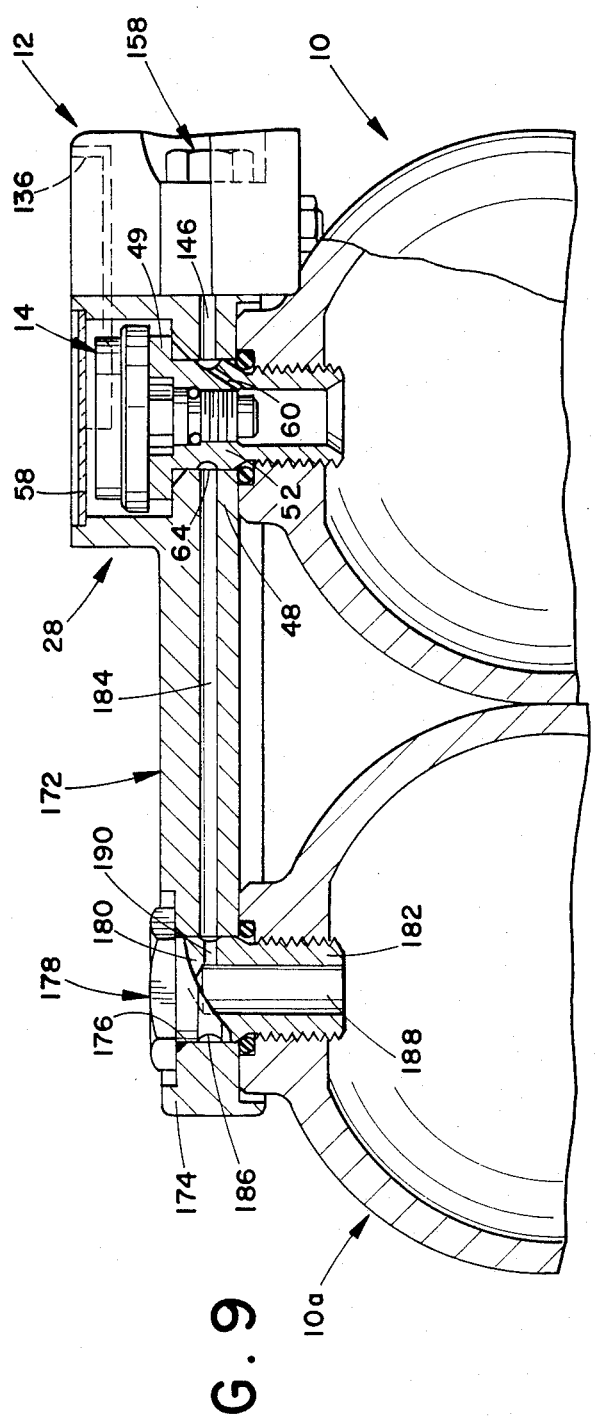

PORTABLE EMERGENCY BREATHING APPARATUS

BACKGROUND OF THE INVENTION

The present invention relates to the art of portable emergency breathing apparatus and, more particularly, to improvements in connection with such apparatus in which breathing gas from a source in continuously supplied at a controlled rate to the user.

Portable emergency breathing apparatus in which breathing gas from a source such as a compressed oxygen container is continuously supplied at a controlled rate to a face mask or hood worn by the user is generally referred to as open circuit apparatus in that the gas breathed by the user from the container is exhaled to atmosphere. Such apparatus generally includes a pressure reducing valve assembly and an adjustable flow restriction cooperable therewith to control the rate of flow of breathing gas to the user, and a pressure gauge for indicating the pressure in the breathing gas container and thus the availability of breathing gas with respect to the duration of use of the apparatus.

There are a number of potential uses for short duration apparatus of the foregoing character which would, for example, provide a five minute or ten minute breathing gas supply. Often, the environments of such potential use are such that storage of a large number of units is required in a relatively small storage space. Among the disadvantages with respect to such units heretofore available is the fact that the pressure reducing valve and pressure gauge are generally individually coupled with the supply container through the use of standard pipe couplings and fittings, whereby the apparatus is rather bulky and has exposed parts which are subject to easy damage either in connection with the storage thereof, the retrieval from storage, or in use. More particularly in this respect, the exposed parts are subject to contact with objects including other breathing apparatus in a common storage area, the surface on which the apparatus is stored, and numerous objects which can be encountered during use. Moreover, the bulkiness of the apparatus increases the required space for storage thereof, and this is especially disadvantageous in connection with the storage of a large number of units where storage space is of a premium, such as in an airplane. Still further, the use of structurally separate valves and pressure gauge components and pipe couplings and fittings in connection with the mounting thereof on a supply container renders the apparatus undesirably heavy.

Another disadvantage, not necessarily limited to short duration apparatus, resides in the inability to maintain a substantially constant flow rate throughout the designed duration of the unit. More particularly in this respect, the pressure regulator of the unit is intended to respond to the pressure drop thereacross between the supply cylinder and the user so as to maintain a substantially uniform rate of gas flow to the user throughout the designed duration of the unit and regardless of the cylinder pressure which continuously decreases during use of the apparatus. Pressure regulator arrangements heretofore provided for use in emergency breathing apparatus have not functioned satisfactorily in this respect and, in addition to not provide a desired uniformity in flow rate during use of the apparatus, often function such that the flow rate falls below the desired flow rate prior to use of the apparatus for the designed duration thereof. Moreover, as the designed time duration is approached, descent of the flow rate progressively increases, whereby the flow rate not only falls below the desired flow rate but does so to such an extent and with such rapidity that usefulness of the apparatus is terminated prior to reaching the designed time duration. It will be appreciated that the latter is potentially hazardous to a user of the apparatus who, for example, remains in a dangerous environment based on an erroneous assumption that the apparatus will be effectively operable for the designated period of time. Efforts to avoid this problem have included the use of larger supply gas cylinders which is undesirable in that this increases the size and weight of the apparatus. Moreover, this approach does not resolve the primary problem, namely the inability of the pressure regulator to function to achieve a uniform flow rate throughout the designed duration.

SUMMARY OF THE INVENTION

In accordance with the present invention, open circuit emergency breathing apparatus is provided which includes a housing for the component parts of the apparatus mountable on the open end of a compressed breathing gas supply container in a manner which optimizes compactness of the apparatus, lightness of weight thereof, and protection for the component parts during storage and use of the apparatus. More particularly in this respect, the pressure reducing valve is within the housing and is manually operable through an exteriorly accessible operating knob or lever which is recessed relative to the housing and thus protected from engagement with an object contacting the outermost surface portions of the container and housing. Preferably, the housing has a radially outer peripheral portion which is within the cylindrical plane of the side wall of the breathing gas supply container, whereby the apparatus can be stored on its side with the housing out of contact with the supporting surface. This advantageously protects against the imposition of lateral stress on the joint between the container and housing during storage. Further in accordance with a preferred embodiment, the housing is mounted on the open end of a supply container by means of a coupling which supports a pressure gauge having an outer end recessed inwardly relative to the outer surface of the housing. This structural arrangement serves both to protect the gauge from engagement with objects contacting the housing and to promote axial and radial compactness of the apparatus. Advantageously, the axially outer end of the housing can be made generally planar and transverse to the axis of the supply container, whereby the apparatus can be stored upright with either the closed end of the container or the axially outer surface of the housing engaging the support surface, again with the component parts protected from engagement with the supporting surface. In the preferred housing structure, the radially outer peripheral portion thereof extends less than 180° relative to the axis of the supply container, thus optimizing compactness and lightness of weight of the housing and thus the overall apparatus.

In accordance with another aspect of the invention, an improved pressure reducing valve is provided by which a predetermined, desired rate of flow of gas from a gas supply container is maintained substantially uniform throughout the desired period of duration for the breathing apparatus, thereby optimizing operational efficiency and usefulness of the breathing apparatus throughout the designed time of duration. More particularly in this respect, a diaphragm component of the pressure regulating valve operates to control the flow of gas from the supply container in response to a reduction in pressure downstream of the diaphragm, and the manner in which the diaphragm is mounted and displaceably supported within the valve housing provides for an extremely sensitive and accurate responsiveness thereof to pressure variations. Furthermore, the improved operating characteristics are achieved with a structure which promotes radial and axial compactness of the valve assembly and thus the desired compactness with respect to the apparatus in its entirety.

It is accordingly an outstanding object of the present invention to provide an improved portable emergency breathing apparatus of the open circuit type.

Another object is the provision of apparatus of the foregoing character wherein exteriorally accessible and/or visible component parts are supported by a housing mountable on the open end of a breathing gas supply container in a manner whereby such component parts are protected from engagement with objects contacting the housing.

A further object is the provision of apparatus of the foregoing character wherein the housing has a radially outer surface relative to the container axis which is within the cylindrical plane of the outer surface of the side wall of the container, thus to optimize protection for the connection between the housing and container.

Yet another object is the provision of apparatus of the foregoing character which optimizes optional storage dispositions with respect to the apparatus and protection of component parts of the apparatus from damage during storage, retrieval and use thereof.

Still a further object is the provision of apparatus of the foregoing character in which gas flow control and pressure gauging components are supported in a housing mountable on the container so as to optimize protection for the component parts while minimizing the weight thereof and promoting axial and radial compactness relative to the gas supply container.

Still another object is the provision of apparatus of the foregoing character in which a predetermined flow rate is substantially uniformly maintained throughout the designed duration time for the apparatus.

Yet a further object is the provision of a pressure regulating valve assembly operable between a gas supply container and a point of use to deliver gas from the supply container to the point of use at a predetermined flow rate which is maintained generally uniform for a predetermined period of time.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawing in which:

FIG. 4 is a sectional elevation view taken along line 4—4 in FIG. 1;

FIG. 8 is a plan view of a modification of the housing of the apparatus; and,

FIG. 9 is a sectional elevation view taken along line 9—9 in FIG. 8.

DESCRIPTION OF PREFERRED EMBODIMENTS

Figure 1:
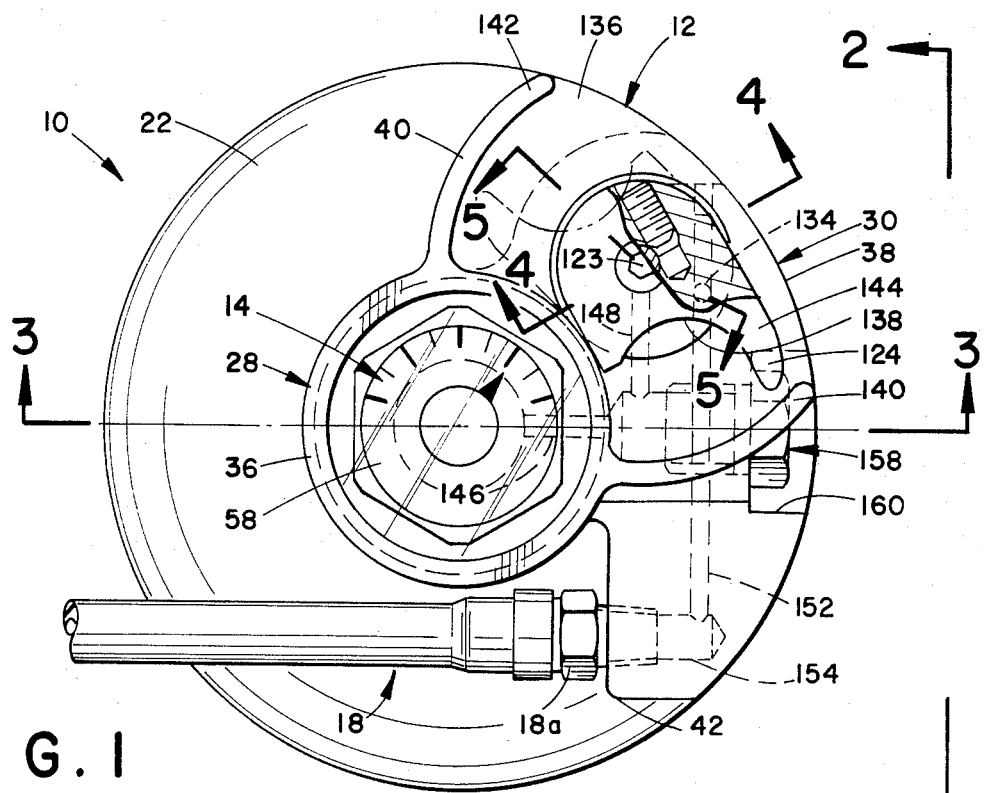
FIG. 1 is a plan view partially in section of portable emergency breathing apparatus according to the present invention.

With reference now in greater detail to the drawing wherein the showings are for the purpose of illustrating preferred embodiments of the invention only, and not for the purpose of limiting the invention, FIGS. 1–7 illustrate portable emergency breating apparatus comprising a compressed breathing gas container in the form of a cylinder 10, and a housing 12 mounted on the open end of the cylinder as described hereinafter. Housing 12 supports a pressure gauge 14 for visually indicating the pressure of gas in container 10, and a pressure reducing valve assembly 16 for controlling the flow of breathing gas from cylinder 10 to a breathing hose 18 leading to a face mask or hood worn by the user of the apparatus. Cylinder 10 has an internally threaded neck portion 20 providing the cylinder with an open upper end and an axis A. Cylinder 10 further includes an outwardly and downwardly flaring skirt portion 22, a cylindrical side wall 24, and a closed bottom 26.

Housing 12 includes a radially inner portion 28 concentric with axis A and a radially outer portion 30 which is preferably within the cylindrical plane of the outer surface of side wall 24 of cylinder 10. The housing further includes an axially outermost end surface 32 transverse to axis A, an axially inner end surface 34 which faces skirt portion 22 of cylinder 10, and a peripheral side surface between the axially outer and inner end surfaces. The peripheral side surface includes a radially inner portion 36 extending about a portion of cylinder neck 20, a radially outer portion 38 having a circumferential extent of less than 180° with respect to axis A, a connecting portion 40 between one end of portion 36 and the corresponding end of portion 38, and a chordal connecting portion 42 between the other end of portion 36 and the corresponding end of portion 38. Chordal portion 42 advantageously enables the breathing hose 18 to be coupled to the housing axially inwardly of outer end surface 32 and radially inwardly of the cylindrical plane of wall 24 of cylinder 10, whereby the connected end of the hose and its coupling 18a are protected from damage by objects contacting housing 12 or cylinder 10 during storage and use of the apparatus.

Figure 3:
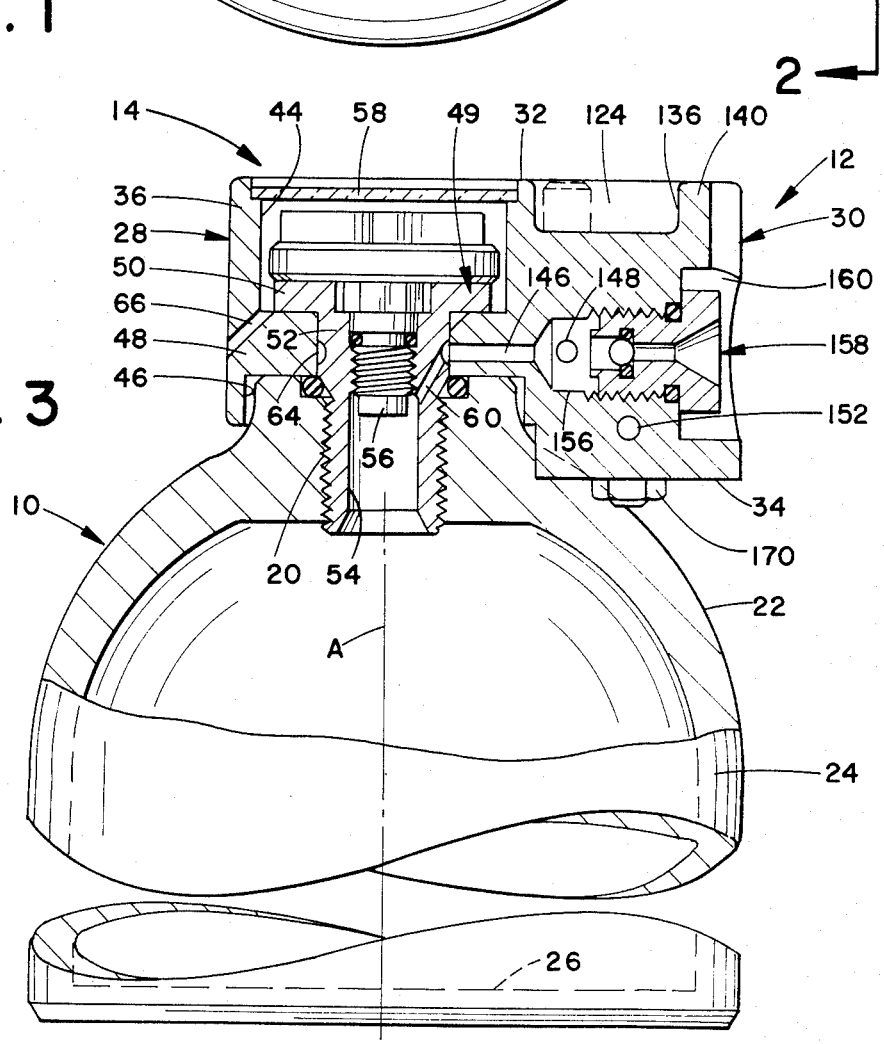
FIG. 3 is a sectional elevation view taken along line 3—3 in FIG. 1.

As best seen in FIG. 3, radially inner portion 28 of housing 12 is provided with axially outer and inner recesses 44 and 46, respectively, coaxial with axis A and providing a wall 48 transverse to axis A. Recess 46 is adapted to axially receive upper end of cylinder neck 20 which engages against the underside of wall 48, and advantageously optimizes minimizing the overall axial length of the apparatus as defined by axially outer end surface 32 of housing 12 and bottom 26 of cylinder 10. Wall 48 is apertured to receive a coupling sleeve 49 by which housing 12 is mounted on the open end of cylinder 10. The coupling sleeve includes a radially outwardly extending flange 50 engaging the axially outer side of wall 48, an upper shank portion 52 extending through the aperture in wall 48, and an externally threaded lower shank portion 54 interengaging with internally threaded cylinder neck 20. Pressure gauge 14 has an externally threaded stem 56, and upper shank portion 52 of the coupling sleeve is internally threaded for interengagement therewith to mount the pressure gauge in recess 44 inwardly of axially outer end surface 32 of the housing. Thus, gauge 14 is protected by recess 44 from contact by an object engaging end surface 32. Preferably, a plastic cover 58 closes the axially outer end of recess 44 to enclose and further protect gauge 14. Upper shank portion 52 of the coupling sleeve is provided with a passageway 60 having its lower end communicating with the interior of cylinder 10 through lower shank portion 54. Shank portion 52 further includes a radially inwardly extending circumferentially continuous recess 64, and the upper end of passageway 60 opens into the latter recess. Preferably, the closed gauge recess 44 is vented to atmosphere by means of a port 66 through wall 48.

Figure 5:
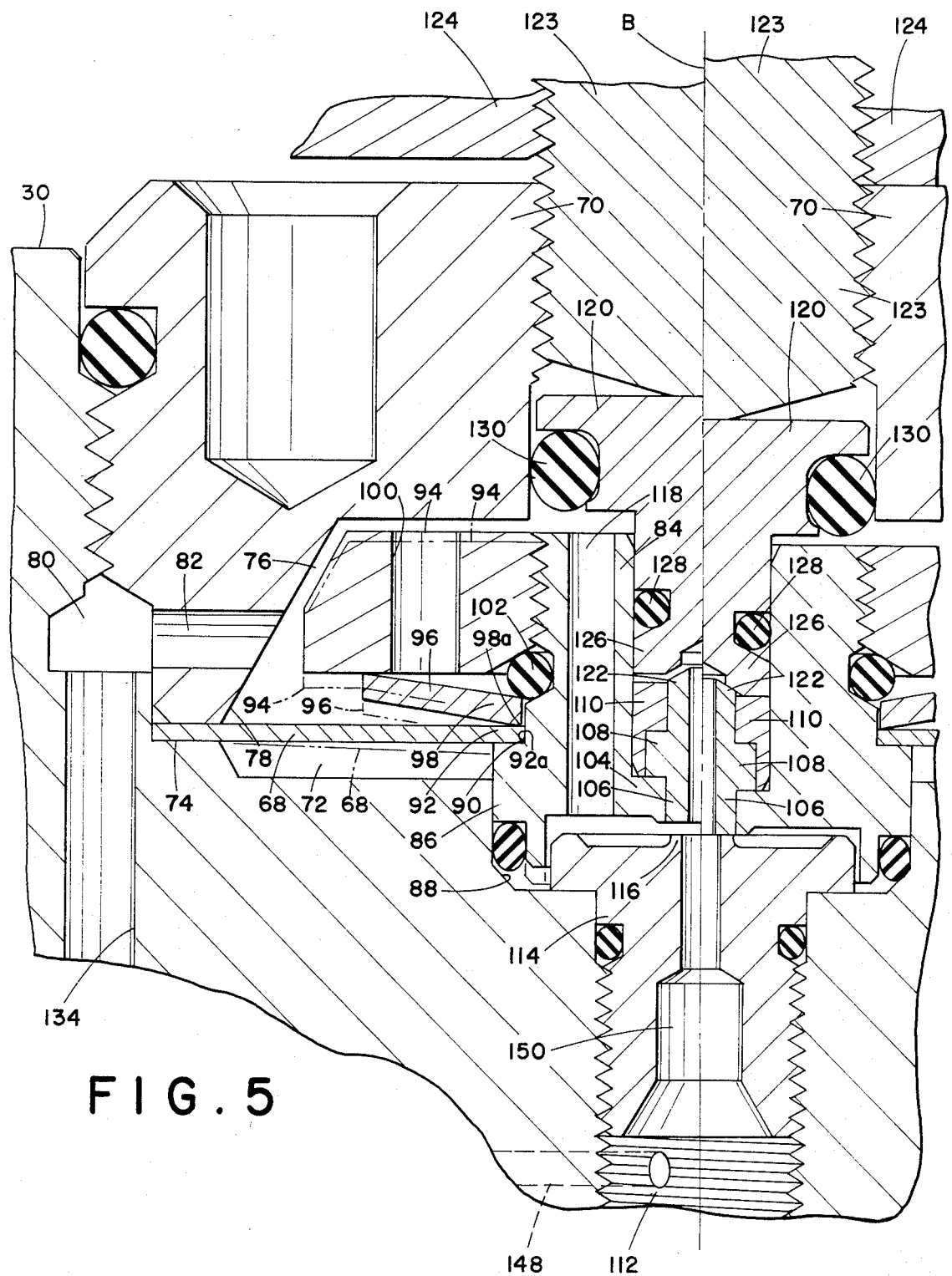
FIG. 5 is an enlarged view, in section, of a portion of the pressure regulator valve taken along line 5—5 in FIG. 1 and showing the valve in both the open and closed positions thereof.
Figure 6:
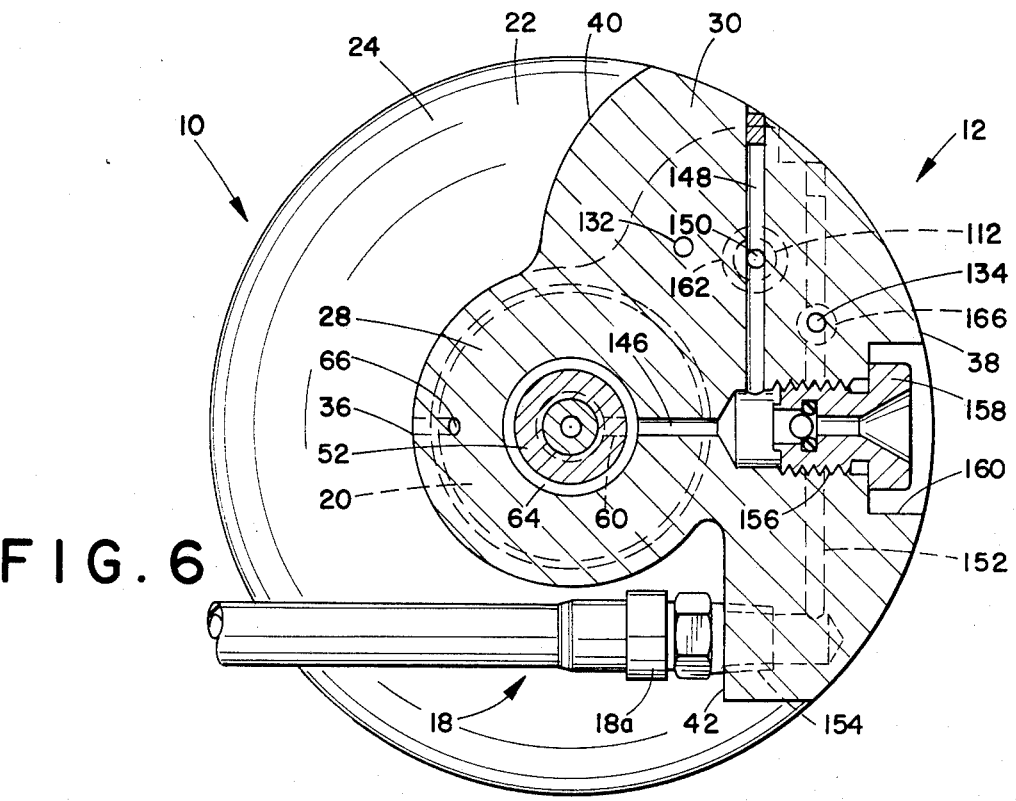
FIG. 6 is a plan view, in section, taken along line 6—6 in FIG. 2.
Figure 7:
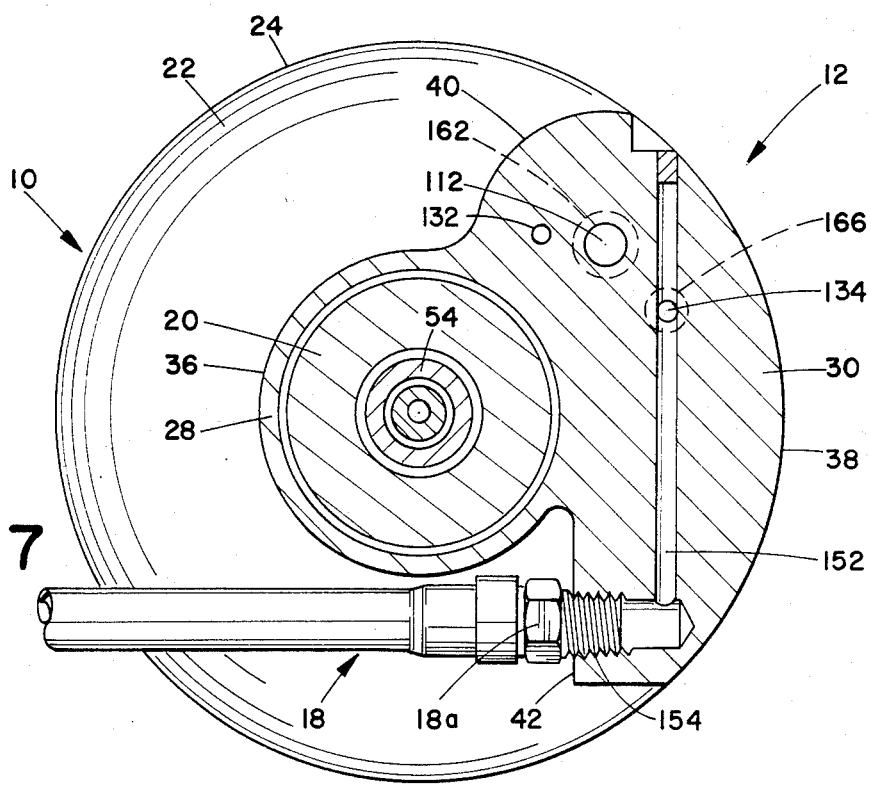
FIG. 7 is a plan view, in section, taken along line 7—7 in FIG. 2.

Pressure reducing valve 16 is in radially outer portion 30 of housing 12 and, as best seen in FIGS. 4 and 5, comprises a diaphragm assembly having an axis B and including an annular diaphragm 68 of thin, planar sheet metal disposed in a recess in housing portion 30. The diaphragm assembly is mounted in the housing recess by means of an externally threaded end cap member 70. More particularly in this respect, the axially inner end of the recess in housing portion 30 provides a lower diaphragm chamber 72 peripherally bounded by a shoulder 74 underlying the outer peripheral edge of diaphragm 68, and the axially inner end of cap member 70 is recessed to provide an upper diaphragm chamber 76 and includes a peripheral rib 78 at the lower end thereof which engages the outer periphery of diaphragm 68 against shoulder 74 to clamp the diaphragm and thus the diaphragm assembly in place. An annular recess 80 is provided in housing 30 radially outwardly of and about rib 78, and a passageway 82 extends radially through rib 78 to communicate recces 80 with upper diaphragm chamber 76 for the purpose set forth hereinafter.

The diaphragm assembly further includes a sleeve member 84 having a lower end 86 slidably received in an annular recess 88 in the body portion and provided with a shoulder 90 on which the inner peripheral edge 92 of diaphragm 68 rests. The upper end of sleeve 84 is externally threaded to receive an internally threaded mounting nut 94, and an annular spring washer 96 is interposed between nut 94 and inner edge 92 of diaphragm 68, whereby inner edge 92 of the diaphragm is axially captured between the inner peripheral edge 98 of spring washer 96 and shoulder 90 of sleeve 84. The lower radially innermost edges of inner ends 92 and 98 of the diaphragm and spring washer are rounded as respectively indicated by the numerals 92a and 98a, whereby it will be appreciated that the radially inner edge of the diaphragm is effectively supported to pivot relative to shoulder 90 about points of contact defined by rounded edges 92a and 98a. Nut 94 is provided with an opening 100 therethrough, and an O-ring seal 102 is provided between sleeve 84 and the radially inner edges of nut 94 and spring washer 96, the purpose of which opening and seal is described hereinafter. The lower inner end of sleeve 84 is provided with a radially inwardly extending circumferential flange 104 which supports a cylindrical nozzle component 106. Nozzle 106 has a radially outwardly extending circumferential flange 108 intermediate the opposite ends thereof and seating against flange 104, and the nozzle is held against flange 104 for displacement with sleeve 84 by means of a mounting sleeve 110 having a press fit with the inner periphery of the opening through the sleeve member.

Body portion 30 is provided with a gas flow passageway 112 through which gas flows from cylinder 10 to valve assembly 16, and the upper end of passageway 112 threadedly receives a seat insert 114 having an annular seat 116 at the upper end thereof. Seat 116 is aligned with the lower edge of nozzle 106, whereby the flow of gas from cylinder 10 to valve assembly 16 is closed off when nozzle 106 engages against seat 116 as set forth hereinafter. When nozzle 106 is axially spaced from seat 116 gas from cylinder 10 flows radially outwardly across seat 116, and sleeve 84 is provided with a gas flow passageway 118 through which the gas then flows into upper diaphragm chamber 76. A piston member 120 is axially interposed between upper end 122 of nozzle 106 and the axially inner end of an externally threaded valve actuating stem 123. Stem 123 is rotatable about axis B, which is parallel to axis A, and the stem extends through a threaded opening therefor in end cap 70 and is provided on its axially outer end with an operating lever 124. Upper end 122 of nozzle 106 is beveled for seating engagement with a correspondingly contoured surface on axially inner end 126 of piston 120, and the piston is sealingly engaged with sleeve 84 and cap member 70 by O-ring seals 128 and 130, respectively. Lower diaphragm chamber 72 is vented to atmosphere by means of a passageway 132 which opens through axially inner end surface 34 of housing 30, and a passageway 134 opens into annular recess 80 and provides for the flow of gas downstream from diaphragm chamber 76 as more fully described hereinafter.

The axially outer end of portion 39 of housing 12 is provided with a laterally open axially extending recess 136 which receives operating lever 124 and provides for the latter to be axially within end surface 32 of the housing when the apparatus is in the "off" position. As best seen in FIG. 1, the configuration of valve operating lever 124 provides an arcuate recess 138 which is radially outwardly of stem 123. In the "off" position shown in FIG. 1, recess 138 faces the radially inner end of recess 136 and an arcuate wall 140 defining one of the circumferentially opposite sides of recess 136, the other of which sides is defined by an arcuate wall 142. The lever configuration facilitates turning lever 124 counterclockwise in FIG. 1 to the "on" position by engaging a finger between recess 138 and wall 140 to achieve displacement of the lever. Advantageously, recess 138 and wall 140 enable a user to quickly locate the finger hole defined thereby by "feel", and this facilitates turning the apparatus "on" under adverse conditions such as darkness. It will be appreciated that lever 124 has an extreme counterclockwise position in FIG. 1 corresponding to the "on" condition of the apparatus, as shown by the broken line disposition of the lever. In the "on" position, outer side edge 144 of lever 124 engages against the radially inner end of recess 136 and thus requires intentional engagement of the lever such as by a fingernail between recess 136 and edge 144 to move the lever from the "on" to the "off" position. Recess 136 advantageously provides for the axially outer end surface of operating lever 124 to be coplanar with or axially inwardly of the plane of outer end surface 32 of housing 12 when in the "on" position, and provides for the lever to be radially within the cylindrical plane of wall 24 of cylinder 10 when the lever is in both the "on" and "off" positions thereof.

Figure 2:
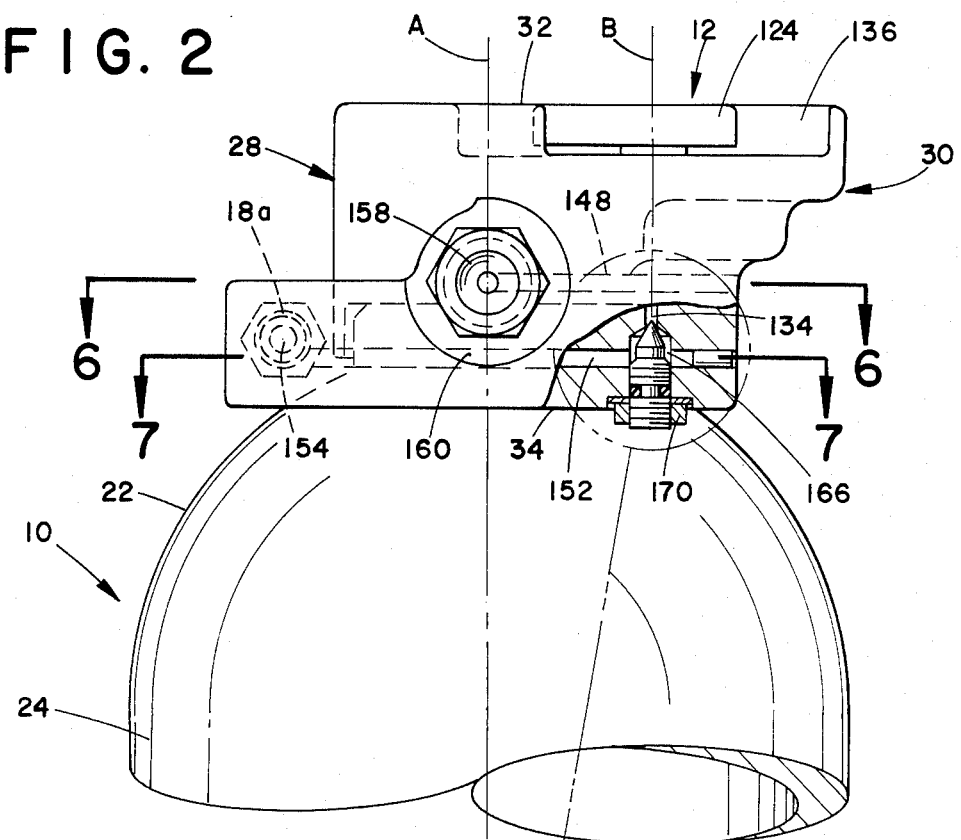
FIG. 2 is a side elevation view partially in section of the apparatus looking in the direction of line 2—2 in FIG. 1.
Figure 2A:
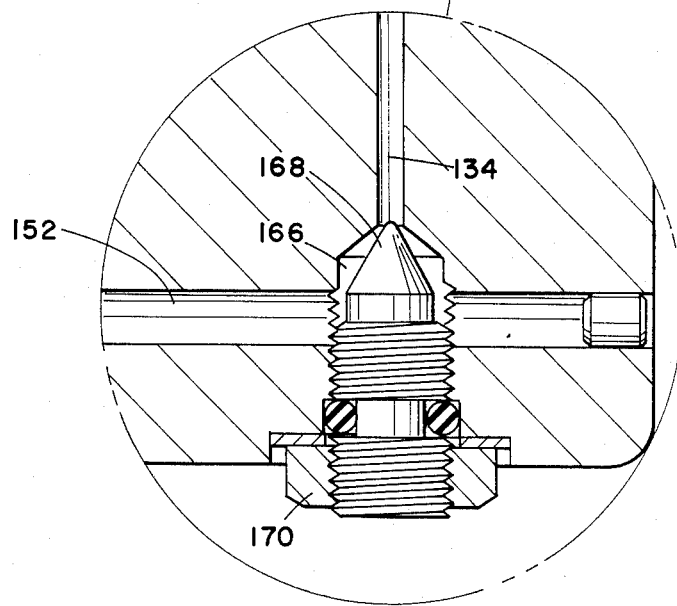
FIG. 2A is an enlarged detail view of the flow restricting valve shown in FIG. 2.

Housing 12 is provided with passageways providing flow communication between the interior of cylinder 10 and breathing hose 18, and valve 16 operates to open and close the passageways with respect to the flow of breathing gas therethrough. As best seen in FIGS. 3-7 of the drawing, the passageways between cylinder 10 and hose 18 include a radially extending-passageway 146 opening from recess 64 in shank portion 52 of coupling sleeve 49, and a passageway 148 connected to passageway 146 and leading laterally therefrom to the vertically extending port 112 which communicates with the opening 150 through seat insert 114. The passageways through the housing further include the vertically extending passageway 134 communicating with recess 80 extending about diaphgram 68, and a passageway 152 parallel to passageway 148 and leading from passageway 134 to an outlet port 154 which opens through chordal side wall portion 42 of the housing and is connected to breathing hose 18 by means of coupling 18a. The radially outer end of passageway 146 is in communication with a radially outward extending port 156 which receives a ball-type check valve fitting 158. Check valve insert 158 provides a fill port to facilitate filling cylinder 10 with oxygen and, in a well known manner, includes a check valve element which provides for the inflow of gas to cylinder 10 while preventing gas escaping from the fill port following a filling operation. The outer end of insert 158 is disposed in a recess 160 in body 12, whereby the fitting is advantageously positioned radially inwardly of the plane of radially outer side surface 38 of housing 12 and thus protected from contact by objects engaging the latter surface. As best seen in FIG. 4, the lower end of passageway 112 is in communication with a bore 162 in the underside of portion 30 of housing 12 and which bore receives a high pressure responsive burst disc insert 164 which serves a well known purpose in connection with breathing apparatus of the character to which the present invention is directed. As best seen in FIGS. 2 and 2A, the lower end of passageway 134 and the inner end of passageway 152 communicate with a bore 166 which threadedly receives an adjustable flow restricting needle valve element 168 having a nut 170 on the outer end thereof for securing the needle valve in a desired position of adjustment. Needle valve element 168 is preset to provide a determined flow of gas from cylinder 10 when the apparatus is in use, as will be explained hereinafter. The disposition of burst valve 164 and needle valve 168 relative to axially inner end surface 34 of housing 12 advantageously provides for these components to be axially within the opposite ends of the apparatus as defined by upper end surface 32 of housing 12 and bottom 26 of cylinder 10, and radially inwardly of the cylindrical plane of side wall 24 of the cylinder, again to protect these component parts from damage during use or storage of the apparatus. While not designated numerically, it will be appreciated that appropriate seals are provided to prevent the escape of breathing gas between housing 12 and end cap member 70 and between the housing and needle valve 168, burst valve 164, check valve fill insert 158, sleeve 84 and seat insert 114.

When the component parts are in the solid line positions shown therefor in FIG. 1 and the positions shown to the right of axis B in FIG. 5, pressure reducing valve 16 is closed. In this respect, as will be seen to the right of axis B in FIG. 5, actuating stem 123 engages against the outer end of piston 120 for inner end 126 thereof to engage upper end 122 of nozzle 106 to close the lower end thereof against seat 116 of seat insert 114. Such disposition of nozzle 106 provides for sleeve 84 and thus diaphragm 68 to be in the broken line positions shown with respect thereto to the left of axis B in FIG. 5. When operating lever 124 is rotated counterclockwise in FIG. 1 to the broken line position thereof, the apparatus is turned "on" and valve stem 173 moves axially outwardly of end cap 70 to the position shown to the left of axis B in FIG. 5. In response to such displacement of stem 123, gas under pressure from cylinder 10 flows through passageways 60, 146 and 148 to passageway 112 and thence upwardly through passageway 150 in seat insert 114 and upwardly through nozzle 106 to displace piston 120 to the position thereof shown to the left of axis B in FIG. 5. Such displacement of stem 123 also releases nozzle 106, sleeve member 84 and diaphragm 68 for displacement to the position shown to the left of axis B in FIG. 5 under the influence of the gas pressure and the resilience of diaphragm 68, the normal position of which is that shown to the left of axis B. Gas under pressure from cylinder 10 is then free to flow laterally across seat 116, upwardly through passageway 118 in sleeve 84 and thence laterally outwardly across nut 94 into diaphram chamber 76. From diaphragm chamber 76, the gas under pressure flows radially outwardly through passage 82 to annular recess 80 and thence downwardly through passageway 134 and laterally through passageway 152 to outlet port 154 and hose 18. Flow restricting needle valve 168 between passageways 134 and 152 restricts the flow of gas under pressure through passageway 134 to passageway 152, and this creates a back pressure in diaphragm chamber 76 which defines the downstream end of the chamber for the diaphragm assembly. The back pressure acts against the area of the upper side of diaphragm 68, and since the latter area is greater than the area of the diaphragm assembly facing the upstream end of the diaphragm assembly chamber, namely the area of the underside of sleeve 84 and nozzle 106 which is exposed to gas under pressure from cylinder 10, the back pressure biases diaphragm 68 and thus the lower end of nozzle 106 downwardly, thus reducing the area of the opening for the flow of gas under pressure between the lower end of nozzle 106 and seat 116. The adjustment of needle valve 168 enables providing a desired rate of flow of breathing gas to the user.

In response to a drop in pressure downstream of diaphragm 68 due, for example, to a decrease in cylinder pressure resulting from use of the apparatus or to an increased demand for breathing gas by the user, the back pressure against diaphragm 68 is reduced whereby the latter moves upwardly in chamber 76 to increase the area of the opening between the lower end of nozzle 106 and seat 116 and thus increase the flow of air thereacross from cylinder 10. In the regulator disclosed, such responsiveness of diaphragm 68 is controlled in a manner which promotes maintaining a uniform predetermined flow rate through the appratus throughout the designed duration of use thereof, and such control is achieved in part by the provision of nozzle 106 which, as will be appreciated from FIG. 5, provides for gas under pressure from cylinder 10 to flow upwardly therethrough and across upper end 122 into the space between the upper end of the nozzle and mounting block 110 and lower end 126 of piston 120. Thus, in response to a pressure drop in diaphragm chamber 76 and the resulting upward movement of diaphragm 68, the gas under pressure between the upper end of nozzle 106 and the lower end of piston 120 functions as a cushion to control displacement of the lower end of the nozzle away from seat 116, whereby increasing the area of the opening therebetween is more gradual and overshooting of the displacement necessary to accommodate the pressure drop is avoided. Further control of the accuracy with which the regulator responds to pressure changes downstream of the diaphragm is achieved by the provision of opening 100 through nut 94 and sealing ring 102 between nut 94, spring washer 96 and sleeve member 84. In this respect, opening 100 communicates the gas under pressure in diaphragm chamber 76 with the underside of nut 94 and the upper surface of spring washer 96, thus avoiding the pressure differential with respect to nut 94 which would exist without opening 100 due to the difference in surface area above and below the nut. Sealing ring 102 provides a chamber between the lower end of nut 94 and the upper surface of spring washer 96 by precluding flow across the threads between nut 94 and sleeve member 84, whereby the latter chamber and opening 100 provide for equalization of pressure on opposite sides of the nut and washer assembly so that the response of diaphragm 68 to pressure changes in chamber 76 is not influenced by the nut and spring components.

When use of the apparatus is completed, operating lever 124 is rotated clockwise in FIG. 1 from the broken line to the solid line position and, as will be appreciated from the positions of the component parts respectively on the left and right hand sides of axis B in FIG. 5, such rotation of the operating lever displaces piston 120 downwardly for the lower end 126 thereof to engage against upper end 122 of nozzle 106, thus to displace the lower end face of the nozzle against seat 116 to close the upper end of the passageway through seat insert 114 and thus preclude the flow of gas across seat 116 from cylinder 10.

FIGS. 8 and 9 of the drawing illustrate a modification of housing 12 which advantageously enables increasing the duration of use capability of the apparatus. More particularly in this respect, housing 12 is provided with an integral arm 172 extending radially from radially inner portion 28 of housing 12 and having an outer end 174 on which a second breathing gas container 10a is mounted as described hereafter. With the exception of arm 172 and an air flow passageway associated therewith for the purpose set forth hereinafter, the structure of housing 12, the mounting thereof on cylinder 10, and the control of the flow of breathing gas from the cylinder to breathing hose 18 is the ssame as that described hereinabove in connection with FIGS. 1-7. Accordingly, like numerals appear in FIGS. 8 and 9 with regard to the component parts of housing 12.

Outer end 174 of arm 172 is provided with an opening 176 therethrough adapted to receive a headed coupling member 178 having a tubular intermediate shank portion 180 and an externally threaded inner end shank portion 182 interengaging with the integrally threaded neck of cylinder 10a to mount the latter on arm 172. Arm 172 is provided with a gas flow passageway 184 extending from opening 176 radially inwardly of housing 12 through wall 48 therein and having an inner end in flow communication with recess 64 in intermediate portion 52 of coupling 49 by which housing 12 is mounted on cylinder 10. Intermediate portion 180 of coupling 178 is provided with a circumferentially continuous radially inwardly extending recess 186 in flow communication with passageway 184. Further, the tubular configuration of intermediate portion 180 and inner portion 182 of coupling 178 provides a central passageway 188 communicating with the interior of cylinder 10a, and intermediate portion 180 is provided with a radially extending port 190 opening into recess 186. Accordingly, it will be appreciated that breathing gas under pressure in cylinder 10a is in constant flow communication with the valve controlled gas flow passageway in housing 12 by way of recess 64. It will likewise be appreciated that pressure gauge 14 indicates the pressure in both cylinders 10 and 10a, that both cylinders are filled with gas under pressure through fitting 158, and that burst disc insert 164 is exposed to gas under pressure in both cylinders. In the embodiment illustrated in FIGS. 8 and 9, the duration of use of the apparatus is doubled through the use of identical cylinders 10 and 10a, and it will be appreciated that arm 172 can be readily extended beyond end 174 to support yet another breathing gas cylinder in the same manner as that shown for cylinder 10a, thus to further increase the duration of use of the apparatus. Thus, for example, if the apparatus described hereinabove in connection with FIGS. 1-7 has a duration of use of five minutes, a ten minute unit is provided by the addition of cylinder 10a in the embodiment shown in FIGS. 8 and 9, and an additional cylinder of identical capacity would provide a fifteen minute unit.

While particular emphasis has been placed herein on the structures of the preferred embodiments and the structural interrelationships between the component parts thereof, it will be appreciated that many changes can be made in the preferred embodiments and that other embodiments of the invention can be made without departing from the principals thereof. Accordingly, it is to be distinctly understood that the descriptive matter herein is to be interpreted merely as illustrative of the invention and not as a limitation.

Having thus described the invention, it is claimed:

1. A fluid control valve for use with portable emergency breathing apparatus, said valve comprising valve body means mountable on the open end of a compressed breathing gas container component of such breathing aparatus, said valve body means having gas flow passageway means therethrough, said passageway means having inlet and outlet ends, said inlet end being adapted to be in flow communication with gas under pressure in a breathing gas container on which said body means is mounted, said valve body means including diaphragm chamber means between said inlet and outlet ends of said passageway means, a diaphragm assembly, mounted in said body means dividing said chamber means into upstream and downstream ends relative to said inlet and outlet ends of said passageway means, said diaphragm assembly having an axis, said upstream end of said chamber means having an inlet port coaxial with said axis and in communication with said inlet end of said passageway means, said diaphragm including an annular planer metal diaphragm transverse to said axis and means including nozzle means mounted on said diaphragm coaxial with said axis, at least a portion of said means including nozzle means being disposed in said upstream end of said chamber means, the area of said portion of said means including nozzle means being smaller than the area of said diaphragm facing said downstream end of said chamber means, said diaphragm assembly being displaceable perpendicular to the plane of said diaphragm between first and second positions in which said portion of said means including nozzle means respectively opens and closes said inlet port, means including manually operable means supported by said valve body means to displace said diaphragm assembly from said first to said second position and to release said diaphragm assembly for displacement from said second to said first position, said means including nozzle means being axially spaced from said means including manually operable means when said diaphragm assembly is in said first position and said nozzle means communicating said inlet port with said axial space, said diaphragm assembly having an opening therethrough between said upstream and downstream ends of said chamber means, said opening being radially outwardly of said port, whereby the flow of gas from said port through said opening is precluded when said diaphragm assembly is in said second position and occurs when said diaphragm assembly is in said first position, and adjustable flow restricting means in said passageway means between said outlet end thereof and said downstream side of said chamber means.

2. The valve according to claim 1, wherein said manually operable means comprises manually rotatable valve actuator means and axially slidable piston means between said actuator means and said nozzle means.

3. The valve according to claim 1 wherein said means mounted on said diaphragm comprises a sleeve member having a shoulder, said diaphragm having an inner peripheral edge engaging said shoulder, retaining means on said sleeve member, and an annular spring washer between said retaining means and said diaphragm and having an inner peripheral edge engaging said inner peripheral edge of said diaphragm against said shoulder.

4. The valve according to claim 3, wherein the inner peripheral edges of said diaphragm and washer respectively engaging said shoulder and diaphragm are rounded.

5. The valve according to claim 4, wherein said retaining means is nut means interengaged with said sleeve member and said spring washer has an outer peripheral edge engaging said nut means, and an opening through said nut means radially between said outer peripheral edge and said sleeve member.

6. The valve according to claim 4, wherein said opening through said diaphragm assembly includes a passageway through said sleeve member parallel to said axis.

7. The valve according to claim 6, wherein said nozzle means includes a nozzle component mounted on said sleeve member coaxial with said axis.

8. The valve according to claim 7, wherein said manually operable means comprises manually rotatable valve actuator means and axially slidable piston means between said actuator means and said nozzle means.

9. The valve according to claim 8, wherein said retaining means is nut means interengaged with said sleeve member and said spring washer has an outer peripheral edge engaging said nut means, and an opening through said nut means radially between said outer peripheral edge and said sleeve member.

10. The valve according to claim 3, wherein said opening through said diaphragm assembly includes a passageway through said sleeve member parallel to said axis.

11. The valve according to claim 3, wherein said nozzle means includes a nozzle component mounted on said sleeve member coaxial with said axis.

* * * * *